United States Patent
Macher

[11] 3,827,786
[45] Aug. 6, 1974

[54] HIGH-SPEED VARIFOCAL OBJECTIVE SYSTEM

[75] Inventor: Karl Macher, Bad Kreuznach, Germany

[73] Assignee: Jos. Schneider & Co. Optische Werke, Bad Kreuznach, Germany

[22] Filed: Jan. 31, 1973

[21] Appl. No.: 328,846

[30] Foreign Application Priority Data
Feb. 1, 1972  Germany............................ 2204553

[52] U.S. Cl.................................. 350/186, 350/214
[51] Int. Cl. ............................................. G02b 15/18
[58] Field of Search............................ 350/184, 186

[56] References Cited
UNITED STATES PATENTS
3,014,406  12/1961  Back................................... 350/184
3,486,809  12/1969  Macher........................... 350/186 X
3,563,636  2/1971   Macher............................... 350/184

Primary Examiner—John K. Corbin
Attorney, Agent, or Firm—Karl F. Ross; Herbert Dubno

[57] ABSTRACT

A varifocal objective system with a relative aperture of 1:2 and a varifocal ratio of 10:1 consists of a six-member basic objective and a four-component vario attachment, the latter being composed of two axially movable negative components bracketed by two positive components. The first component, which is limitedly axially shiftable for focusing purposes, includes two negative menisci with confronting concave surfaces followed by three positive singlets. The second component consists of a negative meniscus with rearwardly facing concavity, followed by a negative triplet. The third component is a negative doublet. The fourth component consists of two air-spaced positive singlets. The first member of the basic objective is a negative meniscus with forwardly facing concavity.

10 Claims, 2 Drawing Figures

PATENTED AUG 6 1974 3,827,786

HIGH-SPEED VARIFOCAL OBJECTIVE SYSTEM

FIELD OF THE INVENTION

My present invention relates to an improvement in varifocal optical objective systems of the general type disclosed in my prior U.S. Pat. No. 3,707,324.

BACKGROUND OF THE INVENTION

The system disclosed in that prior patent consists of the usual multilens basic objective (sometimes referred to as a relay objective) and a varifocal front attachment composed of two axially movable negative components bracketed by two substantially fixed positive components; the term "substantially fixed" allows for the possibility of limited axial adjustment of one of these front components, especially the first object-side component, for focusing purposes.

With a first component consisting of a negative front lens and three positive singlets, a second component consisting of two negative doublets, a third component in the form of a meniscus-shaped singlet, a fourth component represented by two air-spaced positive singlets, and a basic objective composed of five lens members (all singlets), the system disclosed and claimed in my prior patent has a relative aperture of 1 : 1.8 and a varifocal ratio of about 11 : 1. However, its back-focal length is less than twice its minimum focal length so that relatively little space is available between the basic objective and the image plane for the insertion of ancillary equipment such as, for example, a color separator as used in a color-television camera.

OBJECTS OF THE INVENTION

An object of my present invention is to provide an objective system of this same general character with a relatively increased back-focal length.

Another object is to provide a system of this type which can be conveniently dimensioned for installation in a lens housing by virtue of a far-forward positioning of its entrance pupil.

My invention also aims at realizing these objects in a system which, while approaching the relative aperture and the varifocal ratio of my prior system referred to, is highly corrected for all positions throughout its zoom range and gives passage to a broad optical spectrum.

SUMMARY OF THE INVENTION

Let $f_I$, $f_{II}$, $f_{III}$ and $f_{IV}$ designate the individual focal lengths of the positive first component, the negative second component, the negative third component and the positive fourth component, respectively, of the varifocal front group and let $f_V$ be the focal length of the basic objective or rear group. The system according to my invention then satisfies the following relationships:

$f_{IV} < 0.75 f_I$
$|f_{III}| > 1.1 |f_{II}|$
$f_I < 4 f_V$

More particularly, in keeping with the specific example given hereinafter, $1.75 f_V < f_I < 2.25 f_V$
$0.5 f_V < |f_{II}| < 0.75 f_V$
$f_V < |f_{III}| < 1.5 f_V$
$0.75 f_V < f_{IV} < f_V$ The relative order of magnitude of the individual focal lengths of the several components is as follows:

$f_I > |f_{III}| > f_V > f_{IV} > |f_{II}|$

The first (positive) component consists of two negative menisci with confronting concave surfaces, followed by three positive singlets. The negative second component consists of a negative meniscus with rearwardly facing concavity, followed by a negative triplet having a concave front surface. The negative third component is a doublet, also with a concave front surface. The positive fourth component consists of two air-spaced positive singlets. The basic objective is composed of six air-spaced lens members, the first of these members being a negative meniscus with forwardly facing concavity; the second, fourth, fifth and sixth members are all positively refracting, the third and sixth members being doublets.

The presence of the negative menisci in the first and second components of the varifocal front group or attachment increases their respective back-focal lengths over their individual focal lengths $f_I$, $f_{II}$ and results in a forward shift of the entrance pupil. The use of cemented lenses in the negative components and in the basic objective improves the chromatic performance of the system. Except for the five singlets of the front component, the lens diameters of all the members of the vario group can be made approximately equal to those of the basic objective.

BRIEF DESCRIPTION OF THE DRAWING

The above and other features of my invention will now be described in detail with reference to the accompanying drawing in which.

SPECIFIC DESCRIPTION

Figure 1:
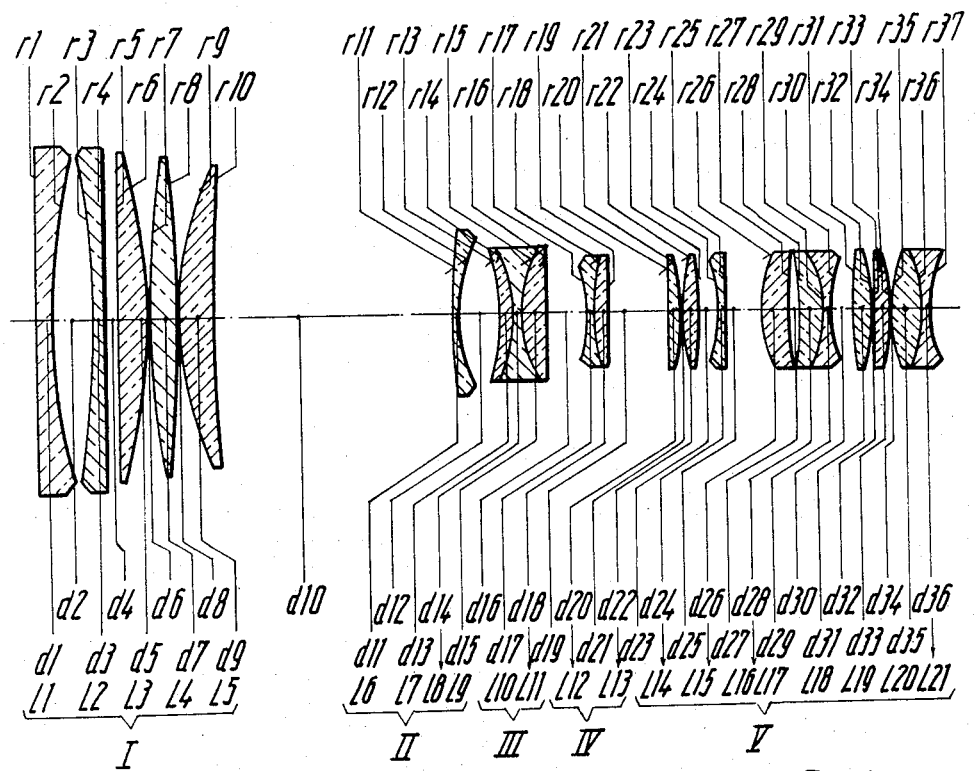
FIG. 1 is a diagrammatic view of an objective system according to my invention.

In FIG. 1 I have shown an optical objective system comprising a front attachment or vario group with four components I, II, III, IV and a basic objective V. Components II and III, which are of negative refractivity, are axially movable to change the overall focal length $f$ between a minimum value $f_{min}$ and a maximum value $f_{max}$; these components have been illustrated in an intermediate position $f_{med}$ of adjustment. All the other components are considered stationary, except that front component I may be bodily displaceable for a change of focus to facilitate the taking of close-ups. A diaphragm, not shown, may be inserted between component IV and basic objective V.

Front component I consists of a first lens L1, in the form of a negative meniscus with rearwardly facing concave surface, having radii $r1$, $r2$ and thickness $d1$; a substantially symmetrically positioned negative meniscus L2 with radii $r3$, $r4$ and thickness $d3$, separated from lens L1 by an air space $d2$; and three positive singlets L3 (radii $r5$, $r6$ and thickness $d5$), L4 (radii $r7$, $r8$ and thickness $d7$) and L5 (radii $r9$, $r10$ and thickness $d9$) separated from their respective predecessor lenses by air spaces $d4$, $d6$ and $d8$.

A variable air space $d10$ separates lens L5 from a negative meniscus L6 with rearwardly facing concavity (radii $r11$, $r12$ and thickness $d11$) representing the first member of component II; the second member of that component, separated from lens L6 by an air space $d12$, is a negative triplet composed of a positive meniscus L7 (radii $r13$, $r14$ and thickness $d13$), a biconcave lens L8 (radii $r14$, $r15$ and thickness $d14$) and a nearly planoconvex lens L9 (radii $r15$, $r16$ and thickness $d15$). Another variable air space $d16$ intervenes between this triplet and a negative doublet representing component III, this doublet consisting of a biconcave lense L10 (radii $r17$, $r18$ and thickness $d17$) cemented onto a nearly planoconvex lens L11 (radii $r18$, $r19$ and thickness $d18$). Between this doublet and a biconvex lens L12 (radii $r20$, $r21$, thickness $d20$), constituting the first member of component IV, there exists a further variable air space $d19$; the second member L13 of this component, also a biconvex lens with radii $r22$, $r23$ and thickness $d22$, is separated by an air space $d21$ from lens L12 and by another air space $d23$ from the first member L14 of basic objective V, this member being a negative meniscus with radii $r24$, $r25$ and thickness $d24$ having a forwardly facing concavity. An air space $d25$ exists between negative meniscus L14 and a positive meniscus L15 (radii $r26$, $r27$ and thickness $d26$) whose rearwardly facing concave surface confronts, across an air space $d27$, a negative doublet consisting of a negative meniscus L16 (radii $r28$, $r29$ and thickness $d28$) cemented onto a biconcave lens L17 (radii $r29$, $r30$ and thickness $d29$). Three further air spaces $d30$, $d32$ and $d34$ separate the last three (positive) members of objective V from this doublet and from one another, namely a biconvex lens L18 (radii $r31$, $r32$ and thickness $d31$), a meniscus L19 (radii $r33$, $r34$ and thickness $d33$) and a final doublet composed of a biconvex lens L20 (radii $r35$, $r36$ and thickness $d35$) cemented onto a biconcave lens L21 (radii $r36$, $r37$ and thickness $d36$).

The following Table gives representative numerical values, in suitable linear units such as millimeters, for the radii $r1 - r37$ and the thicknesses and separations $d1 - d36$ of the system of FIG. 1 which has a relative aperture of 1 : 2, a varifocal ratio of 10 : 1 ($f_{min} = 1$, $f_{max} = 10$) and a back-focal length of 3.84. Also given in the Table are the refractive indices $n_e$ and the Abbe numbers $v_e$ of the lens glasses, based upon the green E line of the spectrum, as well as the surface powers $\Delta n/r$ associated with the several radii. The surface powers may vary within a tolerance range ±0.05; the tolerance range for the lens spacings is ±0.2 whereas the refractive indices $n_e$ and the Abbe numbers $v_e$ may vary by ±0.05 and by ±10, respectively. These tolerances apply also to the corresponding values appearing in the appended claims. The variable distances $d10$, $d16$ and $d19$ of the Table are given for an overall focal length $f_{med} = 4$.

| Lenses | Radii | Thicknesses and separations | $n_e$ | $v_e$ | $\Delta n/r$ |
|---|---|---|---|---|---|
| L1 | r1=+212.59 | | | | +0.0034 |
| | | d1=0.23 | 1.727342 | 29.03 | |
| | r2=+11.11 | | | | −0.0654 |
| | | d2=0.72 | air space | | |
| L2 | r3=−15.55 | | | | −0.0489 |
| | | d3=0.23 | 1.761668 | 27.37 | |
| | r4=−∞ | | | | ±0.0 |
| | | d4=0.22 | air space | | |
| L3 | r5=−212.59 | | | | −0.0030 |
| | | d5=0.53 | 1.643038 | 59.85 | |
| | r6=−9.76 | | | | +0.0659 |
| | | d6=0.01 | air space | | |
| L4 | r7=+19.28 | | | | +0.0333 |
| | | d7=0.49 | 1.643038 | 59.85 | |

-Continued

| Lenses | Radii | Thicknesses and separations | $n_e$ | $v_e$ | $\Delta n/r$ |
|---|---|---|---|---|---|
| | r8=−27.03 | | | | +0.0237 |
| | | d8=0.01 | air space | | |
| L5 | r9=+6.30 | | | | +0.1021 |
| | | d9=0.64 | 1.643038 | 59.85 | |
| | r10=+45.38 | | | | −0.0141 |
| | | d10=4.18 | air space | (variable) | |
| L6 | r11=+8.98 | | | | +0.0881 |
| | | d11=0.14 | 1.792269 | 47.15 | |
| | r12=+2.77 | | | | −0.2858 |
| | | d12=0.70 | air space | | |
| L7 | r13=−4.25 | | | | −0.1789 |
| | | d13=0.23 | 1.761668 | 27.37 | |
| | r14=−2.66 | | | | +0.0170 |
| L8 | | d14=0.12 | 1.716160 | 53.61 | |
| | r15=+2.20 | | | | +0.0031 |
| L9 | | d15=0.47 | 1.723107 | 29.29 | |
| | r16=+23.32 | | | | −0.0310 |
| | | d16=0.74 | air space | (variable) | |
| L10 | r17=−2.94 | | | | −0.2433 |
| | | d17=0.12 | 1.716160 | 53.61 | |
| L11 | r18=+4.62 | | | | +0.0024 |
| | | d18=0.23 | 1.727342 | 29.03 | |
| | r19=−20.73 | | | | +0.0350 |
| | | d19=1.12 | air space | (variable) | |
| L12 | r20=+36.73 | | | | +0.0136 |
| | | d20=0.20 | 1.499597 | 66.77 | |
| | r21=−4.46 | | | | +0.1120 |
| | | d21=0.01 | air space | | |
| L13 | r22=+5.42 | | | | +0.0929 |
| | | d22=0.24 | 1.503488 | 56.15 | |
| | r23=−6.71 | | | | +0.0750 |
| | | d23=0.35 | air space | | |
| L14 | r24=−3.40 | | | | −0.2003 |
| | | d24=0.18 | 1.680826 | 54.93 | |
| | r25=−97.94 | | | | +0.0069 |
| | | d25=0.64 | air space | | |
| L15 | r26=+2.44 | | | | +0.2644 |
| | | d26=0.48 | 1.644180 | 34.36 | |
| | r27=+8.44 | | | | −0.0763 |
| | | d27=0.18 | air space | | |
| L16 | r28=−9.30 | | | | −0.0818 |
| | | d28=0.47 | 1.761668 | 27.37 | |
| L17 | r29=−2.29 | | | | +0.0366 |
| | | d29=0.17 | 1.677641 | 31.97 | |
| | r30=+2.70 | | | | −0.2506 |
| | | d30=0.36 | air space | | |
| L18 | r31=+10.34 | | | | +0.0486 |
| | | d31=0.32 | 1.503488 | 56.15 | |
| | r32=−4.54 | | | | +0.1107 |
| | | d32=0.01 | air space | | |
| L19 | r33=−29.82 | | | | −0.0167 |
| | | d33=0.26 | 1.499597 | 66.77 | |
| | r34=−4.47 | | | | +0.1116 |
| | | d34=0.01 | air space | | |
| L20 | r35=+3.05 | | | | +0.2276 |
| | | d35=0.59 | 1.694013 | 54.48 | |
| | r36=−2.44 | | | | −0.0277 |
| L21 | | d36=0.11 | 1.761668 | 27.37 | |
| | r37=+20.12 | | | | −0.0378 |

Figure 2:
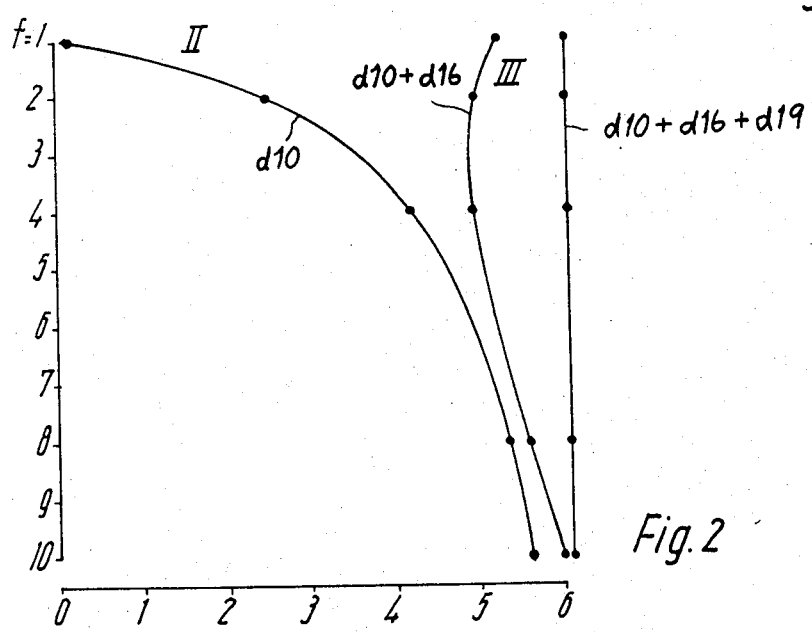
FIG. 2 is a graph showing the law of motion for the movable components of the system of FIG. 1.

In FIG. 2 I have shown the relative variation of air spaces $d10$, $d16$ and $d19$ as determined by the positions of components II and III throughout the zoom range. Specific numerical values of these air spaces for five different overall focal lengths, including minimum focal length $f_{min} = 1$, intermediate focal length $f_{med} = 4$ and maximum focal length $f_{max} = 10$, are given below (in millimeters):

| f | d10 | d16 | d19 |
|---|---|---|---|
| 1.0 | 0.01 | 5.22 | 0.81 |
| 2.0 | 2.45 | 2.49 | 1.10 |
| 4.0 | 4.18 | 0.74 | 1.12 |
| 8.0 | 5.36 | 0.23 | 0.45 |

-Continued

| f | d10 | d16 | d19 |
|---|---|---|---|
| 10.0 | 5.63 | 0.38 | 0.03 |

The individual focal lengths (in millimeters) of components I, II, III, IV, and V are as follows:

$f_I = +8.23$
$f_{II} = -2.41$
$f_{III} = -4.90$
$f_{IV} = +3.44$
$f_V = +4.12$

I claim:

1. A varifocal objective system comprising a basic multilens objective and a varifocal front group preceding said objective, said front group being composed of a substantially fixed positive first component, an axially movable negative second component, an axially movable negative third component and a fixed positive fourth component; said first component consisting of two negative menisci with confronting concavities followed by three air-spaced positive lenses; said second component consisting of a third negative meniscus with rearwardly facing concavity and a first negative lens member air-spaced from each other; said third component being a second negative lens member; said fourth component consisting of two air-spaced positive lens members; the individual focal lengths $f_I$ of said first component, $f_{II}$ of said second component, $f_{III}$ of said third component, $f_{IV}$ of said fourth component and $f_V$ of said basic objecting having substantially the following relative magnitudes:

$f_I = +8.23$
$f_{II} = -2.41$
$f_{III} = -4.90$
$f_{IV} = +3.44$
$f_V = +4.12$

2. A varifocal objective system as defined in claim 1 wherein said first negative lens member is a triplet.

3. A varifocal objective system as defined in claim 1 wherein said second negative lens member is a doublet.

4. A varifocal objective system as defined in claim 1 wherein said first and second negative lens members are cemented members with forwardly facing concave surfaces.

5. A varifocal objective system as defined in claim 1 wherein said basic objective consists of six air-spaced lens members including a negatively refracting first member, a positively refracting second member, a negatively refracting third member and positively refracting fourth, fifth and sixth members.

6. A varifocal objective system as defined in claim 5 wherein said negatively refracting first member is a meniscus with forwardly facing concavity.

7. A varifocal objective system as defined in claim 6 wherein the third and sixth members of said basic objective are doublets, the remaining members thereof being singlets.

8. A varifocal objective system as defined in claim 1 wherein said first and second components have respective back-focal lengths exceeding the absolute values of their individual focal lengths.

9. A varifocal objective system comprising a basic multilens objective and a varifocal front group preceding said objective, said front group being composed of a substantially fixed positive first component, an axially movable negative second component, an axially movable negative third component and a fixed positive fourth component; said first component consisting of two negative menisci with confronting concavities followed by three air-spaced positive lenses; said second component consisting of a third negative meniscus with rearwardly facing concavity and a first negative lens member air-spaced from each other; said third component being a second negative lens member; said fourth component consisting of two air-spaced positive lens members; the relative numerical values of the radii $r1$–$r23$ and of the thicknesses and separations $d1$–$d22$ of said two negative menisci L1 and L2, said three air-spaced positive lenses L3, L4 and L5, said third negative meniscus L6, three cemented lenses L7, L8, L9 constituting said first negative lens member, two cemented lenses L10, L11 constituting said second negative lens member, and said two positive lens members L12, L13, the magnitudes of their refractive indices $n_e$ and Abbe numbers $v_e$, and the surface powers $\Delta n/r$ thereof being substantially as given in the following Table:

| Lenses | Radii | Thicknesses and separations | $n_e$ | $v_e$ | $\Delta n/r$ |
|---|---|---|---|---|---|
| L1 | r1=+212.59 | | | | +0.0034 |
| | | d1=0.23 | 1.727342 | 29.03 | |
| | r2=+11.11 | | | | −0.0654 |
| | | d2=0.72 | air space | | |
| L2 | r3=−15.55 | | | | −0.0489 |
| | | d3=0.23 | 1.761668 | 27.37 | |
| | r4=∞ | | | | ±0.0 |
| | | d4=0.22 | air space | | |
| L3 | r5=−212.59 | | | | −0.0030 |
| | | d5=0.53 | 1.643038 | 59.85 | |
| | r6=−9.76 | | | | +0.0659 |
| | | d6=0.01 | air space | | |
| L4 | r7=+19.28 | | | | +0.0333 |
| | | d7=0.49 | 1.643038 | 59.85 | |
| | r8=−27.03 | | | | +0.0237 |
| | | d8=0.01 | air space | | |
| L5 | r9=+6.30 | | | | +0.1021 |
| | | d9=0.64 | 1.643038 | 59.85 | |
| | r10=+45.38 | | | | −0.0141 |
| | | d10=4.18 | air space | (variable) | |
| L6 | r11=+8.98 | | | | +0.0881 |
| | | d11=0.14 | 1.792269 | 47.15 | |
| | r12=+2.77 | | | | −0.2858 |
| | | d12=0.70 | air space | | |
| L7 | r13=−4.25 | | | | −0.1789 |
| | | d13=0.23 | 1.761668 | 27.37 | |
| | r14=−2.66 | | | | +0.0170 |
| L8 | | d14=0.12 | 1.716160 | 53.61 | |
| | r15=+2.20 | | | | +0.0031 |
| L9 | | d15=0.47 | 1.723107 | 29.29 | |
| | r16=+23.32 | | | | −0.0310 |
| | | d16=0.74 | air space | (variable) | |
| L10 | r17=−2.94 | | | | −0.2433 |
| | | d17=0.12 | 1.716160 | 53.61 | |
| | r18=+4.62 | | | | +0.0024 |
| L11 | | d18=0.23 | 1.727342 | 29.03 | |
| | r19=−20.73 | | | | +0.0350 |
| | | d19=1.12 | air space | (variable) | |
| L12 | r20=+36.73 | | | | +0.0136 |
| | | d20=0.20 | 1.499597 | 66.77 | |
| | r21=−4.46 | | | | +0.1120 |
| | | d21=0.01 | air space | | |
| L13 | r22=+5.42 | | | | +0.0929 |
| | | d22=0.24 | 1.503488 | 56.15 | |
| | r23=−6.71 | | | | +0.0750 |

10. A varifocal objective system as defined in claim 9 wherein said basic objective consists of a negatively refracting first lens member L14, a positively refracting second lens member L15, a pair of cemented lenses L16, L17 constituting a negatively refracting third lens member, a positively refracting fourth lens member L18, a positively refracting fifth lens member L19 and a pair of cemented lenses L20, L21 constituting a positively refracting sixth lens member, the relative numerical values of the radii $r24 - r37$ and the thicknesses and separations $d24 - d36$ of lenses L14 – L21, the magnitudes of their refractive indices $n_e$ and Abbe numbers $\nu_e$, and the surface powers $\Delta n/r$ thereof being substantially as given in the following Table:

| Lenses | Radii | Thicknesses and separations | $n_e$ | $\nu_e$ | $\Delta n/r$ |
|---|---|---|---|---|---|
| L14 | r24=−3.40 | | | | −0.2003 |
|  | r25=−97.94 | d24=0.18 | 1.680826 | 54.93 | +0.0069 |
|  | r26=+2.44 | d25=0.64 | air space | | +0.2644 |
| L15 | r27=+8.44 | d26=0.48 | 1.644180 | 34.36 | −0.0763 |
| L16 | r28=−9.30 | d27=0.18 | air space | | −0.0818 |
|  | r29=−2.29 | d28=0.47 | 1.761668 | 27.37 | +0.0366 |
| L17 | r30=+2.70 | d29=0.17 | 1.677641 | 31.97 | −0.2506 |
|  | r31=+10.34 | d30=0.36 | air space | | +0.0486 |
| L18 | r32=−4.54 | d31=0.32 | 1.503488 | 56.15 | +0.1107 |
|  | r33=−29.82 | d32=0.01 | air space | | −0.0167 |
| L19 | r34=−4.47 | d33=0.26 | 1.499597 | 66.77 | +0.1116 |
|  | r35=+3.05 | d34=0.01 | air space | | +0.2276 |
| L20 | r36=−2.44 | d35=0.59 | 1.694013 | 54.48 | −0.0277 |
| L21 | r37=+20.12 | d36=0.11 | 1.761668 | 27.37 | −0.0378 |

\* \* \* \* \*